Patented Feb. 2, 1954

2,668,165

UNITED STATES PATENT OFFICE 2,668,165

CONDENSATION PRODUCTS OF HIGHER FATTY ACIDS, POLYALKYLENE POLYAMINES, AND ORGANIC HALIDES

Joseph Emmett Carpenter, Greenwich, Conn., assignor to American Cyanamid Company, New York, N. Y., a corporation of Maine No Drawing. Application December 22, 1951, Serial No. 263,006

18 Claims. (Cl. 260—97.5)

This invention relates to new compositions of matter comprising the reaction product of a higher fatty acid, a polyalkylene polyamine and an organic halide and to a process of producing the same.

In United States Patent No. 2,494,132 there is described a process of producing alkyl substituted condensates of higher fatty acids and polyalkylene polyamines in which the simple amides are dehydrated with ring closure to imidazolines at elevated temperatures. Molecular equivalents of a higher fatty acid and a polyalkylene polyamine are first reacted together and then in a second stage of the process, the reaction product from the first reaction step is alkylated by using one molecular equivalent or more of an alkylating agent. The resulting products are stoichiometrical compounds soluble in water.

I have discovered that by using less than a molecular proportion of the alkylating agent and particularly by using from about 2 percent to about 50 percent, by equivalents, per equivalent weight of the fatty acid material employed, as determined from its saponification number, the reaction can not only be carried out in a single reaction step, but improved condensates are produced which may be either of the amide or imidazoline type and which have superior properties to those heretofore known. The new products are water-dispersible cationic surface active agents and may be used with great effectiveness in the textile, lubricant, flotation and allied arts. They are basic materials inasmuch as the proportion of alkylating agent is in no case sufficient to neutralize all of the amine left in a basic condition after the fatty acid has reacted. Since the proportion of the alkylating agent can be varied continuously over a reasonably wide range, it is possible to prepare condensates whose properties will vary continuously over a considerable range. Thus, it is possible by the present invention to prepare products having optimum properties for certain specific applications, or to prepare products of uniform properties from fatty acid materials of somewhat dissimilar composition.

The condensation products of the present invention are prepared by simultaneously reacting a higher fatty acid material, a polyalkylene polyamine and an organic halide at a temperature of between about 120° C. to 300° C. until the reaction is complete. In this condensation, advantageously there is somewhat more than 1 equivalent and preferably about 2 equivalents of the fatty acid or its derivative present for each mol of polyalkylene polyamine. Ratios of fatty acid to polyamine of exactly 1:1 by mols are undesirable since such ratios give products which are mixtures of 1:1 condensate, 2:1 condensate and unreacted polyamine. Ratios of fatty acid to polyamine greater than 2:1 by mols may be used when polyalkylene polyamines higher than the dialkylene triamines are employed in the reaction mixture. Since the higher polyamines are usually obtained as mixtures whose average molecular weights are unknown or uncertain, it is more useful in such cases to specify the quantity of polyamine in equivalents as determined by titration rather than in mols. Ratios of fatty acid to polyalkylene polyamine, in equivalents, of the order of 1:1.5 to 1:2.5, may advantageously be used.

It is an advantage of this invention that it is possible to prepare condensates with good water dispersibility and yet with alkaline properties when employing 2 or more mols of fatty acid per mol of polyamine. Hitherto, when this combination of properties was desired, it was necessary to use the unneutralized 1:1 condensate, which is more expensive both because the amine is used in larger proportions and is the more costly ingredient, and also because it is necessary to use a considerable excess of amine in the reaction to inhibit the formation of 2:1 products and afterwards to remove this excess in an extra step by distillation under high vacuum. Moreover, the water dispersibility of unneutralized 1:1 condensates is very dependent upon the fatty acid employed, and with the more economical polyamines, for example, the dialkylene triamines, is not effective except with the more expensive fatty acids of 12 or fewer carbon atoms.

The amount of organic halide used in the present invention may be varied over a rather wide range but the halide must be present in considerably less than the stoichiometrical amount. Conveniently, the quantity of organic halide used herein may be expressed in terms of equivalents per chemical equivalent of fatty acid employed. In some cases, as little as 0.02 equivalent of halide per equivalent of fatty acid has been found to produce products furnishing usable dispersions in water under conditions of mild agitation, and in nearly all cases as little as 0.05 equivalent of halide per equivalent of fatty acid will yield emulsions which are stable for many hours. The transition from non-dispersibility to dispersibility as the proportion of organic halide is increased occurs very suddenly, within a range of 0.01 to 0.03 equivalent organic halide, and thus the minimum amount of organic halide to be used may be determined accurately. The minimum amount of organic halide that may be used in the reaction mixture may, therefore, be defined as that amount which renders the resulting condensation product dispersible in water.

The maximum amount of organic halide may also be determined quite accurately. In the simultaneous reaction of a fatty acid material, a polyalkylene polyamine, and an organic halide, there is competition between the reaction of the fatty acid material with the polyamine and the reaction of the organic halide with the polyamine. If excessively large quantities of organic halide are used in the reaction mixture, the reaction between the organic halide and the polyamine may predominate with the result that halide salts of the polyamine will separate as an immiscible layer in the reaction vessel and prevent completion of the reaction with the fatty acid. Since the transition from a miscible to an immiscible phase occurs over a range of a few hundredths of an equivalent of organic halide per equivalent of fatty acid, the maximum permissible proportion of halide likewise may be accurately determined. Therefore, the maximum amount of organic halide that may be used may be defined as that amount which does not cause a separation of amine hydrohalide in the reaction vessel.

The maximum permissible proportion of organic halide has been found experimentally to be from about 0.25 to about 0.50 equivalent per equivalent of fatty acid. The amount of halide used depends upon several factors such as the proportion of free fatty acids in the fatty acid material, the kind and proportion of polyamine and on the character of the organic halide used. However, the quantity of organic halide to be used can easily be determined by following the procedure mentioned above. In all cases it has been found that the maximum permissible proportion of organic halide is always less than that required for complete neutralization of the amine left unconsumed by reaction with the fatty acid material. Consequently, the compounds of this invention are basic products and not completely neutralized salts.

As will appear more fully below, not all halides may be used in the minimum and maximum proportions specified. The necessary or permissible amounts will, however, be found to lie within the range specified and the precise amount necessary to produce a water-dispersible product and one that does not separate as an immiscible layer can be determined by following the test procedures outlined herein.

A variety of polyalkylene polyamines may be employed in condensing with fatty acids and organic halides, of which the polyethylene polyamines represent an economically preferred class. More specifically, the polyalkylene polyamines of this invention may be represented as polyamines in which the nitrogen atoms are linked together by groups of the formula —$C_nH_{2n}$—where $n$ is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom. This invention contemplates not only the use of such polyamines as diethylene triamine, triethylene tetramine, tetraethylene pentamine, dipropylene triamine, and bis-(3-aminopropyl) amine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylene diamine, is a very satisfactory starting material. Products prepared from a distillation residue from the refining of the lower polyethylene polyamines, and consisting largely of polyamines higher than tetraethylene pentamine, have also been used satisfactorily. It is also to be understood that compounds containing small groups attached to nitrogen, such as —$CH_2CH_2OH$, which are nearly always present to some extent in commercial polyamines as a result of a side reaction in the usual process by which the polyalkylene polyamines are manufactured, are also included within the scope of this invention. Likewise, the deliberate introduction of these same or other small radicals into a polyamine prior to its reaction with the fatty acid is also embraced herein since the introduction of such groups will occur in the condensation reaction of this invention, and the final product will contain radicals of this kind attached to nitrogen. I may also use the hydroxyalkyl substituted polyamines prepared as described and claimed in my copending application, Serial No. 263,005, filed concurrently herewith. The term "polyalkylene polyamine" employed in the claims, therefore, refers to and includes any of the polyalkylene polyamines referred to above or to a mixture of such polyalkylene polyamines.

A variety of higher fatty acids or derivatives thereof may be employed for reacting with the polyamines and organic halides. The carbon chain length in the fatty acids preferably is from 8 to about 30 carbon atoms, and the hydrocarbon chain may be saturated or unsaturated. Representative higher fatty acids that may be used are lauric, palmitic, stearic, oleic, ricinoleic, capric, myristic, and mixtures of such acids. Mixtures of fatty acids, such as those found in the naturally occurring animal, vegetable, and marine oils, or their glycerides such as those in coconut oil, palm oil, cottonseed oil, linseed oil, olive oil, peanut oil, fish oils, and the like, may also be used.

I may also advantageously use residues from the alkali refining of glyceride oils where such residues contain a large proportion of free or combined fatty acid, such as, for example, acidulated cottonseed oil foots, corn oil soapstock, and menhaden oil foots.

I have found tall oil to be a particularly good starting material from the standpoint of cost. In general, tall oil is composed of a mixture of rosin acids, fatty acids, lignin and unsaponifiable matter. I may use crude tall oil which contains a relatively large percentage of rosin acids, for example, in the neighborhood of 50% rosin acids or I may use various purified fractions of tall oil obtained from tall oil distillation where the rosin acid content may be as low as 1.0% rosin acid. Or I may use mixtures of crude and distilled tall oil with or without other fatty acid containing materials.

When tall oil is used it is usually desirable that little or no rosin acids be left unreacted. As set forth in my copending application referred to, the rosin acids of tall oil react only very incompletely with ordinary polyalkylene polyamines. Where it is desirable to react the rosin acids of the tall oil, therefore, I may use the hydroxyalkyl substituted polyalkylene polyamines prepared as described in the said application. Within the permissible limits of the organic halide as set forth herein, it is also possible to use an organic halide which contains hydroxyalkyl groups in the molecule, that is, by using a halohydrin wholly or in part as the organic halide used. Representative halohydrins include ethylene chlorhydrin, propylene bromhydrin, glycerol monochlorhydrin, glycerol dichlorhydrin and the like. If a tall oil very high in rosin acids is used it may not be possible to use sufficient halohydrin to provide hydroxyalkyl groups equivalent to all of the rosin acids because the upper limit of organic halide will be exceeded causing a separation of amine hydrohalide in the reaction mixture. In such a situation, I may use the hydroxyalkyl substituted polyamines of the said application to supply at least a part of the hydroxyalkyl groups. In this latter case it is also advantageous to use glycerol monochlorhydrin or monobromhydrin as the organic halide since such halides provide two hydroxyl groups for each atom of halide. Or I may dilute the tall oil with some other fatty acid material, low or lacking in rosin acid content, so as to bring the proportion of rosin acids down to a point where they can be conveniently handled by the requisite amounts of halohydrin. This may be accomplished in various ways, such as, for example, by substituting crude tall oil containing 50% rosin acids up to one-third of the amount of fatty acid material employed, and by substituting distilled tall oil containing 33% rosin acids up to one-half of this quantity. Such dilutions of the tall oil with fatty acid materials are only necessary when a high rosin tall oil is used. No difficulty is encountered when a low rosin tall oil is employed for condensing with the polyamines and organic halides.

The term "fatty acid material" as used herein refers to and includes any of the fatty acid containing materials referred to above or to a mixture of such fatty acid containing materials.

A large variety of organic halides may be employed in condensing with the polyalkylene polyamines and with the fatty acid materials. The principal requirements for the organic halide are that at least one halide atom be reactive under the reaction conditions herein employed, and that the remainder of the organic halide molecule not contain groups which will give rise to resins, decomposition products and the like. Although I have used such diverse organic halides as carbon tetrachloride, 1,2,3,-trichloropropane, chlorinated pentanes, and acetyl chloride effectively, such halides are useful only in particular instances, and especially where the proportion of organic chloride is very low. For general application, the organic halide may contain either one or two halide atoms, but at least one of these must be present as the radical —$CH_2X$, X being halogen such as chlorine, bromine, iodine, or fluorine. Where there are two halide atoms, the other may be the same or a different halide and it may be reactive or unreactive. The organic chlorides are preferred for reasons of economy. The remainder of the organic halide molecule is most commonly a hydrocarbon radical of the aliphatic, cycloaliphatic, or aromatic types, although radicals containing ether or thioether linkages, hydroxyalkyl substituents, and sometimes carbonyl groups are among the usable types. Examples of suitable organic halides are methyl iodide, ethyl bromide, octadecyl bromide, isoamyl chloride, benzyl chloride, ethylene chlorhydrin, trimethylene bromhydrin, glycerol monochlorhydrin, glycerol dichlorhydrin, ethylene chlorobromide, BB'-dichlordiethylether, sym. dichloracetone, propylene dichloride, methylene iodide, and orthochlorobenzyl chloride. Even very volatile organic halides can be used without special precautions. Thus, allyl chloride (B. P. 44° C.) does not distill out of the reaction mixture as it might be expected to do, but remains in solution in the reaction mixture as the temperature is raised to the point where it reacts and becomes fixed. Even methyl chloride, which is a gas, can be used by heating a mixture of fatty acid material and polyamine until reaction begins (100–150° C.) and introducing the methyl chloride at a controlled rate well below the surface of the reaction mixture. After its addition is finished, the reaction may be completed in the usual manner.

The organic halide may react either with the polyalkylene polyamine directly or with the fatty acid-polyamine condensate, or with any intermediate fatty acid-polyamine condensate at any of a sequence of stages of reaction. In any case, in the reaction of the organic halide, substituted ammonium salts of the halide atom are formed, with the remainder of the molecule of organic halide attaching to nitrogen. This reaction modifies to some degree the normal reactions of amide formation and ring closure, although even with the larger proportions of organic halide, amide formation and ring closure reactions retain their fundamental character.

The multiplicity of possibilities for the reaction of the organic halide leads to mixtures of great complexity in the final reaction products. The reaction of the organic halide may give simple substituted ammonium hydrohalides, or by the successive reaction of several molecules of organic halide with a single nitrogen atom, quaternary ammonium salts may be formed. Quaternary ammonium salts may also result from reaction of tertiary amino nitrogen in an imidazoline ring. The reaction of the organic halide with the polyalkylene polyamine converts primary amino groups to secondary amino groups, so that in subsequent reaction of the fatty acid, its point of attachment may not be the same as would otherwise be the case; or imidazoline formation may be prevented by replacement by the organic radical of a hydrogen atom which would otherwise have taken part in the ring-closure reaction. The nitrogen atom to which the organic radical from the organic halide becomes attached need not necessarily be the same as that which takes up the hydrogen halide to form a salt, and the amino nitrogen so protected by salt formation will tend to escape reaction with the fatty acid. It is thus evident that the final cationic surface active agent is a complex mixture of simple hydrohalide salts with quaternary ammonium salts, and with primary, secondary, and tertiary amines as the free bases, which differs appreciably from the product made by reacting the fatty acid and polyamine in one step and afterwards reacting the organic halide in a second, separate step.

A satisfactory method of preparing the compounds of the present invention comprises heating a mixture of the fatty acid material, the polyalkylene polyamine, and the organic halide above 100° C. in a single reaction step, with provision for removal of water or other volatile products of the reaction. While the completion of the reaction can be ascertained unequivocally by analyses of the reaction product for free acids and for ionized halide, it ordinarily is entirely adequate merely to determine basic amino nitrogen, conveniently performed by potentiometric titration in alcoholic solution by means of alcoholic hydrochloric acid and by use of glass electrodes. This determination, in which any amine combined merely as the soap will be titrated, indicates complete reaction when no further decrease is observed in the quantity of basic nitrogen in successive samples. In most cases, it suffices merely to observe the temperature, which rises as the reaction proceeds, and, in general, as carried out in commercial practice, the reaction will be complete when the temperature reaches 180–250° C. Temperatures up to 300° C. may sometimes be used, however. The completion of the reaction can also be judged by condensing the water distilled out and measuring its volume. The progress of the reaction can also be judged by the rate of water evolution, which diminishes rapidly toward the end of the reaction.

In Tables I and II which follow are shown the results obtained from reacting various ratios, by equivalents, of specific polyalkylene polyamines, higher fatty acid materials, and organic halides. The experiments reported in Table I show the lower limit of organic halide that may be used to obtain a water-dispersible product, while those reported in Table II show the upper limit of organic halide that may be used without obtaining a separation of amine hydrohalide.

Table I

| Fatty Acid Material | Polyalkylene Polyamine | Organic Halide | Ratio by Equivalents | Remarks |
|---|---|---|---|---|
| Commercial Oleic Acid (Red Oil).[1] | Tetraethylene Pentamine. | Octadecyl Bromide | 1:⅝:0.05 | Excellent dispersion. |
| Do | do | do | 1:⅝:0.04 | Dispersed but gave unstable emulsion. |
| Do | do | do | 1:⅝:0.03 | Some tendency toward dispersion, but incomplete. |
| Do | do | do | 1:⅝:0.02 | Very incomplete dispersion. |
| Do | do | do | 1:⅝:0.01 | Virtually no dispersion. |
| Do | do | Sym. Dichlor Acetone | 1:⅝:0.05 | Excellent dispersion. |
| Do | do | do | 1:⅝:0.04 | Do. |
| Do | do | do | 1:⅝:0.03 | Complete dispersion, stable several hours. |
| Do | do | do | 1:⅝:0.02 | Complete dispersion but unstable emulsion. |
| Do | do | do | 1:⅝:0.01 | Some tendency toward dispersion, but very incomplete even in hot water. |
| Coconut Fatty Acid.[2] | Diethylene Triamine. | Benzyl Chloride | 1:1.5:0.05 | Excellent dispersion. |
| Do | do | do | 1:1.5:0.04 | Complete dispersion, stable several hours. |
| Do | do | do | 1:1.5:0.03 | Complete dispersion, but unstable emulsion. |
| Do | do | do | 1:1.5:0.02 | Partial but incomplete dispersion. |
| Do | do | do | 1:1.5:0.01 | Very incomplete dispersion. |
| NeoFat No. 17 (C22).[3] | Bis (3-amino propyl) amine. | Allyl Chloride | 1:1.5:0.10 | Complete dispersion. |
| Do | do | do | 1:1.5:0.09 | Very nearly but not quite complete dispersion. |
| Do | do | do | 1:1.5:0.08 | Considerable but incomplete dispersion. |
| Do | do | do | 1:1.5:0.07 | Incomplete dispersion. |
| Do | do | do | 1:1.5:0.05 | Excellent dispersion. |
| Coconut Fatty Acid.[2] | Diethylene Triamine. | Glycerol dichlorhydrin | 1:1.5:0.04 | Complete dispersion, stable for hours. |
| Do | do | do | 1:1.5:0.03 | Almost but not quite complete dispersion. |
| Do | do | do | 1:1.5:0.02 | Incomplete dispersion. |
| NeoFat No. 17 [3] | Bis (3-amino propyl) amine. | Trimethylene Chlorhydrin | 1:1.5:0.14 | Complete dispersion. |
| Do | do | do | 1:1.5:0.13 | Complete dispersion, but emulsion showed slight separation ine one-half hour. |
| Do | do | do | 1:1.5:0.12 | Almost but not quite complete dispersion. |
| Do | do | do | 1:1.5:0.11 | Considerable dispersion but incomplete. |
| Do | do | do | 1:1.5:0.10 | Incomplete dispersion. |
| Acintol D [4] | Diethylene Triamine. | Dichlordiethylether | 1:2.0:0.10 | Complete dispersion but emulsion separated after one hour. |
| Do | Diethylene triamine reacted with 0.28 equiv. ethylene oxide. | do | 1:2.0:0.08 | Complete dispersion. |

[1] Saponification No. 203.7; acid No. 196.2.
[2] Saponification No. 260.0; acid No. 240.6.
[3] Saponification No. 178.4; acid No. 121.2.
[4] Saponification No. 193.7; acid No. 188.0; rosin acid No. 55.0.

Table II

| Fatty Acid Material | Polyalkylene Polyamine | Organic Halide | Ratio by equivalents | Temp., °C. | Remarks |
|---|---|---|---|---|---|
| NeoFat 3R[1] | Diethylene Triamine | Benzyl Chloride | 1:1.5:0.25 | 275 | Separation of amine HCl. |
| Do | do | do | 1:1.5:0.20 | 287 | Borderline—slight separation of amine HCl but reaction completed. |
| Do | do | do | 1:1.5:0.18 | 258 | Satisfactory—only temporary and slight cloudiness at start of reaction. |
| NeoFat No. 7 (C8)[2] | Triethylene Tetramine. | Octadecyl Bromide | 1:2:0.25 | 120 | Separation. |
| Do | do | do | 1:2:0.22 | 120 | Slight separation. |
| Do | do | do | 1:2:0.20 | 120 | No separation. |

See footnotes at end of table.

Table II—Continued

| Fatty Acid Material | Polyalkylene Polyamine | Organic Halide | Ratio by equivalents | Temp., °C. | Remarks |
|---|---|---|---|---|---|
| NeoFat 3R [1] | Bis (3-amino propyl) amine. | 2,2' dichlor diethylether | 1:2.5:0.40 | 227 | No separation. |
| Do | do | do | 1:2.5:0.50 | 229 | Temporary cloudiness at start of reaction but no separation. |
| Do | do | do | 1:2.5:0.55 | 223 | Do. |
| Do | do | do | 1:2.5:0.57 | 216 | Very cloudy with definite existence of a slight amount of amine HCl; nevertheless, reaction could be completed. |
| Do | Diethylene triamine | Ethylene Chlorhydrin | 1:2.5:0.15 | 235 | No separation. |
| Do | do | do | 1:2.5:0.18 | 250 | Slight temporary cloudiness but no separation of amine HCl. |
| Do | do | do | 1:2.5:0.20 | 273 | Borderline—slight separation of amine HCl but reaction completed. |
| Do | do | do | 1:1.5:0.25 | 259 | Separation. |
| Do | do | do | 1:1.5:0.20 | 275 | No separation. |
| Do | do | do | 1:1.5:0.23 | 260 | Temporary cloudiness but no separation of layer and amine HCl. |
| Do | do | do | 1:1.5:0.25 | 275 | Very cloudy with slight separation of amine HCl, but reaction completed. |
| Do | do | do | 1:1.5:0.30 | 278 | Separation. |
| Do | do | Propylene Bromhydrin | 1:1.5:0.20 | 275 | No cloudiness; no separation. |
| Do | do | do | 1:1.5:0.28 | 273 | Faint cloudiness but no separation of amine HBr. |
| Do | do | do | 1:1.5:0.30 | 281 | Very cloudy with slight separation of amine HBr. Reaction completed. |
| Do | Tetraethylene Penamine. | Ethylene Chlorhydrin | 1:2.5:0.25 | 283 | No separation; no cloudiness. |
| Do | do | do | 1:2.5:0.35 | 260 | Temporary cloudiness but no separation. |
| Do | do | do | 1:2.5:0.37 | 242 | Do. |
| Do | do | do | 1:2.5:0.38 | 248 | Borderline, only slight separation of amine HCl. |
| Do | do | do | 1:2.5:0.40 | 241 | Appreciable separation but nevertheless possible to complete reaction. |
| NeoFat No. 7 [2] | Bis (3-amino propyl) amine. | Propylene Bromhydrin | 1:1.5:0.20 | 124 | No cloudiness. |
| Do | do | do | 1:1.5:0.30 | 122 | No cloudiness, no separation. |
| Do | do | do | 1:1.5:0.35 | 120 | Slight separation of amine HBr on sides of flask above liquid but redissolved readily on agitation. |
| Do | do | do | 1:1.5:0.37 | 120 | Separation of amine HBr only on sides of flask above liquid; soluble in liquid. |
| Do | do | do | 1:1.5:0.40 | 120 | Separation. |
| Acintol D [3] | Diethylene Triamine | Dichlordiethylether | 1:2.0:0.23 | 255 | Temporary cloudiness but no separation of amine HCl. |
| Do | do | do | 1:2.0:0.25 | 230 | Separation. |
| Do | Diethylene Triamine reacted with 0.28 equiv. Ethylene oxide. | do | 1:2.0:0.25 | 284 | Cloudiness but no separation. |

[1] Saponification No. 201.3; acid No. 192.8.
[2] Saponification No. 384.5; acid No. 372.9.
[3] Saponification No. 193.7; acid No. 188.0; rosin acid No. 55.0.

In the following table are shown the reaction products of various fatty acid materials, polyalkylene polyamines and organic halides in the ratios, by equivalents, as have been found to produce excellent results in actual practice.

Table III

| Fatty Acid Material | Polyalkylene Polyamine | Organic Halide | Ratio by Equivalents |
|---|---|---|---|
| Commercial Oleic Acid (Red Oil) [1] | Polyamine "A" [2] | Ethylene dichloride | 1:2:0.05 |
| Aruba crude naphthenic acid [3] | Tetraethylene pentamine | Dichlordiethylether | 2:5:0.30 |
| Castor Oil [4] | Bis (3-aminopropyl) Amine | do | 1:2:0.15 |
| Acintol D [5] | do | Glycerol monochlorhydrin | 1:1.5:0.138 |
| Cottonseed Oil Foots [6] | Diethylene Triamine (85% grade). | Ethylene chlorhydrin | 6:9:1 |
| Coconut Fatty Acids [7] | do | do | 6:9:1 |
| Corn Oil Soapstock [8] | do | do | 6:9:1 |
| Soy Oil Soapstock [9] | do | do | 6:9:1 |
| Fish Oil Fatty Acids [10] | do | do | 6:9:1 |
| Acintol F. A. No. 1 [11] | do | do | 6:9:1 |
| 1:2 mixture of crude tall oil and cottonseed oil foots (by equiv. to give ⅙ equiv. of rosin acids). | do | do | 2:4:9:1 |
| 3:2 mixture of Acintol D and cottonseed oil foots (by equiv. to give ⅙ equiv. of rosin acids). | do | do | 3.6:2.4:9:1 |

[1] Saponification No. 203.7; acid No. 196.2.
[2] Distillation residue from refining of polyethylene polyamines equiv. wt. 54.0 by titration.
[3] Saponification No. 224.6; acid No. 209.6.
[4] Saponification No. 183.9; acid No. 19.8.
[5] Saponification No. 193.7; acid No. 188.0; rosin acid No. 55.0.
[6] Saponification No. 196.3; acid No. 132.0.
[7] Saponification No. 260.0; acid No. 240.6.
[8] Saponification No. 190.6; acid No. 128.9.
[9] Saponification No. 195.0; acid No. 151.8.
[10] Saponification No. 193.0; acid No. 76.2.
[11] Saponification No. 196.9; acid No. 191.7; rosin acid No. 3.5.

I claim:

1. A composition of matter comprising the condensation product from the simultaneous reaction at a temperature of about 120° C. to about 300° C. of a higher fatty acid material, a polyalkylene polyamine and an organic halide containing the radical —$CH_2X$, X being halogen, the ratio of higher fatty acid radicals to nitrogen in said product being between about 1:1.5 to 1:2.5, by equivalents, and the proportion of organic halide in said product being from about 0.02 to about 0.50 the number of equivalents of the fatty acid material.

2. A composition of matter as in claim 1 wherein the higher fatty acid material is selected from the group consisting of oleic acid and the glycerides of oleic acid and mixtures thereof.

3. A composition of matter as in claim 2 wherein the organic halide is a chloride.

4. A composition of matter as in claim 3 wherein the polyakylene polyamine is essentially diethylene triamine.

5. A composition of matter as in claim 1 wherein the higher fatty acid material is tall oil.

6. A composition of matter as in claim 5 wherein the organic halide is a chloride.

7. A composition of matter as in claim 5 wherein the organic halide is ethylene chlorhydrin.

8. A composition of matter as in claim 5 wherein the polyalkylene polyamine contains hydroxyalkyl substituents.

9. A composition of matter as in claim 5 wherein the polyalkylene polyamine is essentially diethylene triamine.

10. A process of preparing a new composition of matter comprising simultaneously reacting at a temperature of about 120° C. to about 300° C. a higher fatty acid material, a polyalkylene polyamine and an organic halide containing the radical —$CH_2X$, X being halogen, the polyalkylene polyamine being at least equivalent to the higher fatty acid material present in the reaction mixture, and the halide being present in the reaction mixture in an amount sufficient to cause the resulting condensation product to be water-dispersible but not in such an amount as to cause a separation of an immiscible layer of polyamine hydrohalide, said amount of halide being in no event less than 0.02 equivalent nor greater than 0.50 equivalent per equivalent of said fatty acid material.

11. A process as in claim 10 wherein the higher fatty acid material is selected from the group consisting of oleic acid and the glycerides of oleic acid and mixtures thereof.

12. A process as in claim 11 wherein the organic halide is a chloride.

13. A process as in claim 12 wherein the polyalkylene polyamine is essentially diethylene triamine.

14. A process as in claim 10 wherein the higher fatty acid material is tall oil.

15. A process as in claim 14 wherein the organic halide is a chloride.

16. A process as in claim 14 wherein the organic halide is ethylene chlorhydrin.

17. A process as in claim 14 wherein the polyalkylene polyamine contains hydroxyalkyl substituents.

18. A process as in claim 14 wherein the polyalkylene polyamine is essentially diethylene triamine.

JOSEPH EMMETT CARPENTER.

References Cited in the file of this patent

UNITED STATES PATENTS

| Number | Name | Date |
|---|---|---|
| 2,243,329 | De Groote et al. | May 27, 1941 |
| 2,391,831 | Jayne et al. | Dec. 25, 1945 |